(12) United States Patent
Grehl et al.

(10) Patent No.: US 10,369,958 B2
(45) Date of Patent: Aug. 6, 2019

(54) DEFORMATION ELEMENT FOR A MOTOR VEHICLE, AND MOTOR VEHICLE COMPRISING A DEFORMATION ELEMENT OF SAID TYPE

(71) Applicant: Bayerische Motoren Werke Aktiengesellschaft, Munich (DE)

(72) Inventors: Marco Grehl, Schoenberg (DE); Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/852,085

(22) Filed: Dec. 22, 2017

(65) Prior Publication Data

US 2018/0118155 A1 May 3, 2018

Related U.S. Application Data

(63) Continuation of application No. PCT/EP2016/064178, filed on Jun. 20, 2016.

(30) Foreign Application Priority Data

Jun. 26, 2015 (DE) .................. 10 2015 211 979

(51) Int. Cl.
*B60R 21/34* (2011.01)
*B60R 19/18* (2006.01)
(Continued)

(52) U.S. Cl.
CPC ............. *B60R 21/34* (2013.01); *B60R 19/18* (2013.01); *B60R 19/34* (2013.01); *B60R 19/36* (2013.01);
(Continued)

(58) Field of Classification Search
CPC ... B60R 19/34; B60R 19/18; B60R 2019/247; B60R 19/023; B60R 19/03; B60R 19/24;
(Continued)

(56) References Cited

U.S. PATENT DOCUMENTS 3,097,725 A * 7/1963 Peterson ................. B60R 19/36
188/268
5,181,589 A * 1/1993 Siegner ................... B60R 19/36
188/268
(Continued)

FOREIGN PATENT DOCUMENTS

DE 10 2004 059 545 A1 6/2006
DE 603 16 232 T2 6/2008
(Continued)

OTHER PUBLICATIONS

German-language Search Report issued in counterpart German Application No. 10 2015 211 979.3 dated May 4, 2016 with partial English translation (14 pages).
(Continued)

*Primary Examiner* — D Glenn Dayoan
*Assistant Examiner* — Sunsurraye Westbrook
(74) *Attorney, Agent, or Firm* — Crowell & Moring LLP

(57) ABSTRACT

To improve the safety of passengers of a motor vehicle and road users in the case of a head-on collision, a deformation element is provided and includes a crossmember holder for mounting to a crossmember and a bumper plate that can be positioned next to a bumper of a motor vehicle. The deformation element is characterized in that a centrifugal force-operated release element for adjusting and locking the distance of the crossmember holder from the bumper plate is provided between the bumper plate and the crossmember holder. A first distance of the bumper plate from the crossmember holder, starting from a normal position, is greater in a first position than a distance in a second position.

14 Claims, 9 Drawing Sheets

(51) Int. Cl.
*B60R 19/34* (2006.01)
*B60R 19/36* (2006.01)
*B60R 19/40* (2006.01)
*B60R 19/26* (2006.01)

(52) U.S. Cl.
CPC ...... *B60R 19/40* (2013.01); *B60R 2019/1893* (2013.01); *B60R 2019/262* (2013.01); *B60R 2021/343* (2013.01)

(58) Field of Classification Search
CPC ...... B60R 2019/1813; B60R 2019/262; B60R 19/04; B60R 2019/182; B60R 19/30; F16F 7/12; F16F 7/125; F16F 7/121; F16F 7/123
USPC ....... 293/132, 133, 102, 120, 142, 115, 121, 293/146, 153, 4; 296/187.09, 82, 187.03, 296/203.02, 187.11, 190.01
See application file for complete search history.

(56) References Cited

U.S. PATENT DOCUMENTS

| | | | |
|---|---|---|---|
| 5,443,146 A * | 8/1995 | Ayyildiz | B60R 19/36 188/371 |
| 7,192,067 B2 * | 3/2007 | Hansen | B60R 19/34 293/132 |
| 8,246,091 B1 | 8/2012 | Jayasuriya et al. | |
| 9,592,780 B2 * | 3/2017 | Wendel | B60R 19/26 |
| 2004/0119302 A1 | 6/2004 | Schambre et al. | |
| 2004/0222667 A1 | 11/2004 | Ericsson | |
| 2011/0042975 A1 * | 2/2011 | Faruque | B60R 19/28 293/118 |
| 2012/0286529 A1 | 11/2012 | Gukkenberger et al. | |
| 2013/0307288 A1 * | 11/2013 | Wavde | B60R 19/34 296/187.05 |

FOREIGN PATENT DOCUMENTS

| | | |
|---|---|---|
| DE | 10 2007 057 051 A1 | 5/2009 |
| DE | 10 2011 009 943 A1 | 8/2011 |
| DE | 10 2012 213 035 A1 | 2/2013 |
| EP | 1 864 866 A1 | 12/2007 |

OTHER PUBLICATIONS

International Search Report (PCT/ISA/210) issued in PCT Application No. PCT/EP2016/064178 dated Sep. 19, 2016 with English translation (5 pages).
German-language Written Opinion (PCT/ISA/237) issued in PCT Application No. PCT/EP2016/064178 dated Sep. 19, 2016 (5 pages).

* cited by examiner

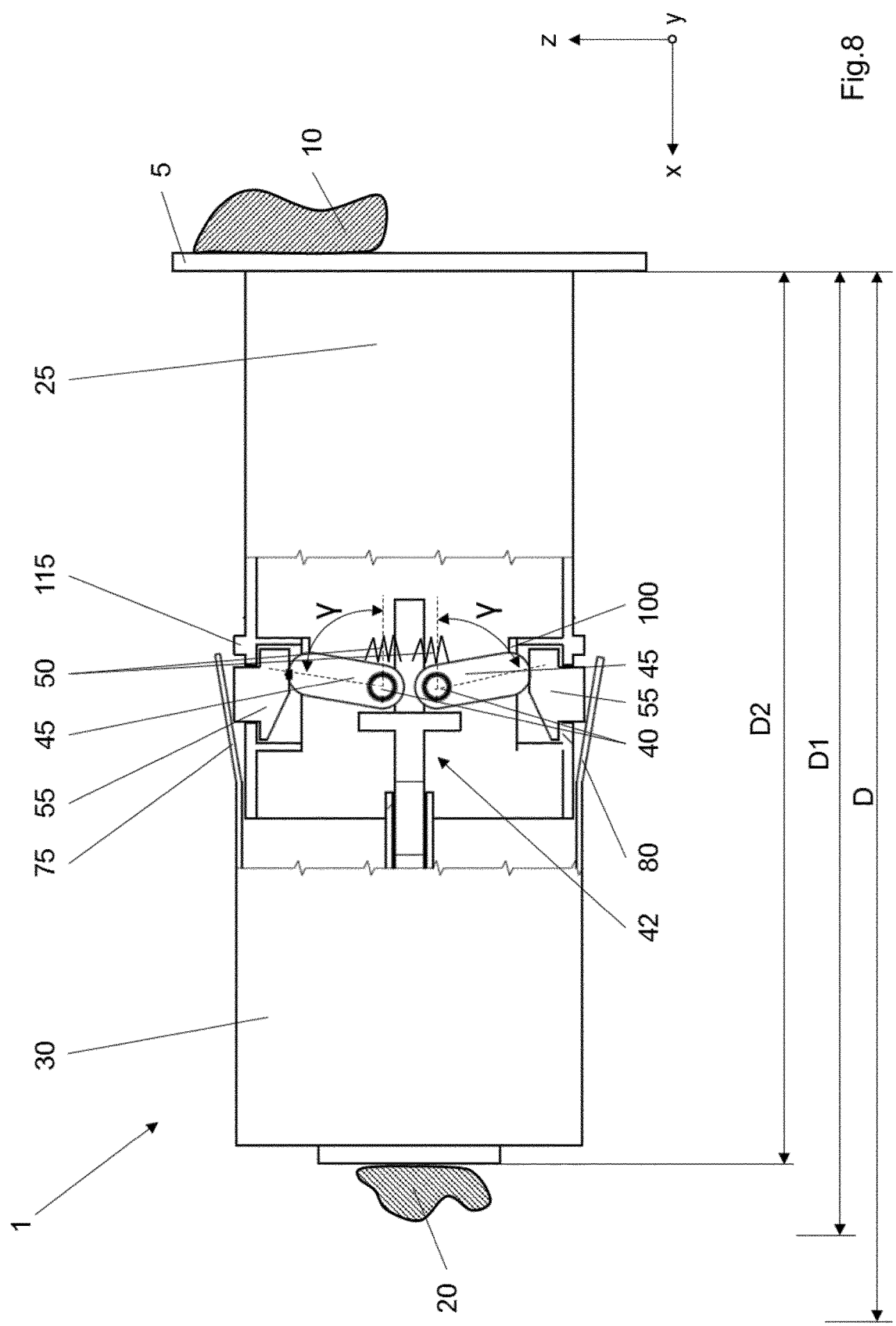

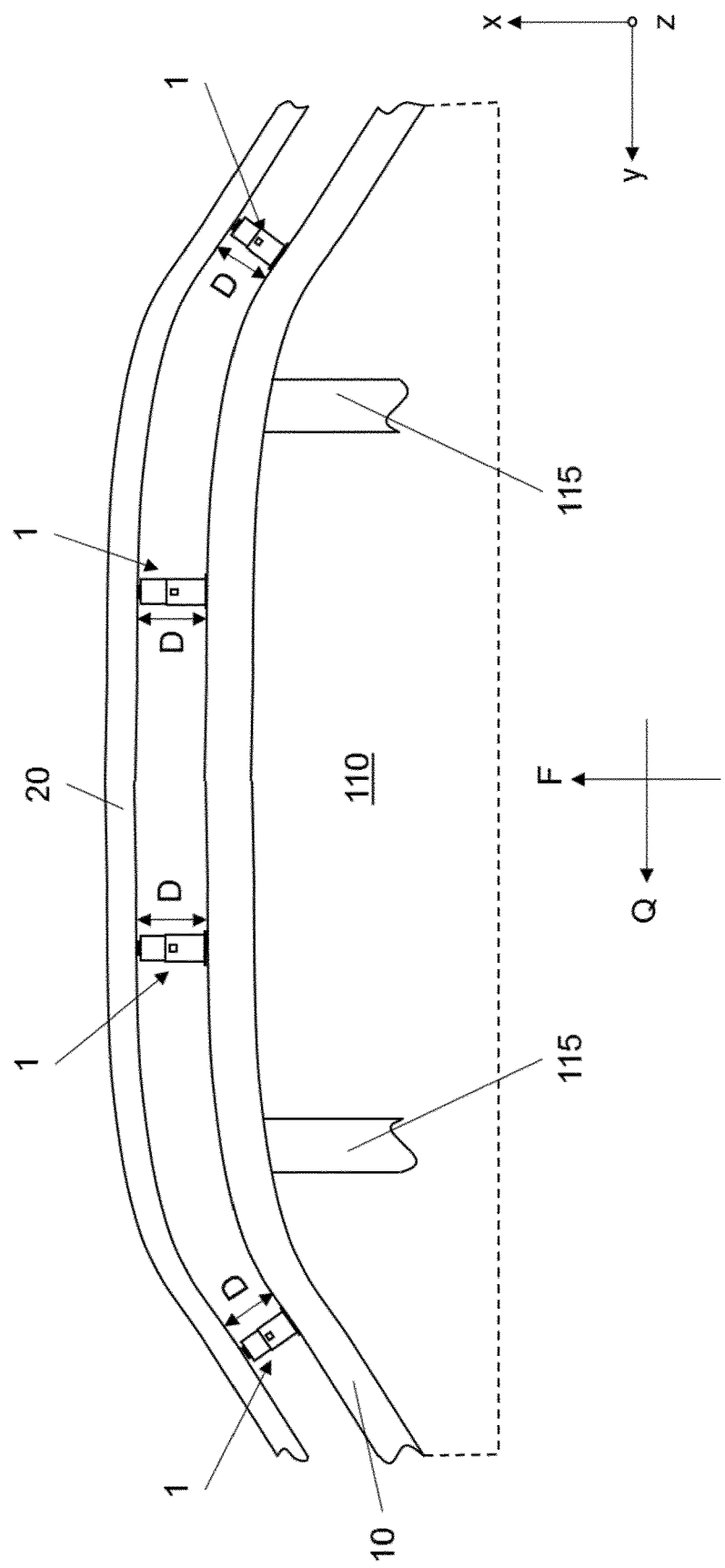

DEFORMATION ELEMENT FOR A MOTOR VEHICLE, AND MOTOR VEHICLE COMPRISING A DEFORMATION ELEMENT OF SAID TYPE

CROSS REFERENCE TO RELATED APPLICATIONS

This application is a continuation of PCT International Application No. PCT/EP2016/064178, filed Jun. 20, 2016, which claims priority under 35 U.S.C. § 119 from German Patent Application No. 10 2015 211 979.3, filed Jun. 26, 2015, the entire disclosures of which are herein expressly incorporated by reference.

BACKGROUND AND SUMMARY OF THE INVENTION

The present invention relates to a deformation element for a motor vehicle having a crossmember holder for attaching to a crossmember and a bumper plate that is positionable next to a bumper of the motor vehicle. Furthermore, the present invention relates to a motor vehicle equipped with such a deformation element.

In order to protect a motor vehicle in the event of a frontal collision, as well as occupants of the motor vehicle who are involved in such a collision and persons, in particular pedestrians, who are located outside the motor vehicle and get caught up in the collision, a number of measures are provided.

In the event of what is known as a low speed crash, in which a comparatively high load of up to about 100 kN acts on the front region of a motor vehicle at a comparatively low speed of 4 km/h to about 20 km/h (for example, in the form of a parking dent), provision is made for the load to be absorbed reversibly and with as little disruption as possible by a deformation element of the vehicle.

In order to provide a pedestrian protection function in the front region of a motor vehicle, provision is made for a comparatively low load of up to about 5 kN in a comparatively high speed range of about 20 km/h to 40 km/h to be absorbed by a deformation element provided in the front region of the motor vehicle.

In order to realize protection in the case of a low speed crash and for a pedestrian protection function, DE 10 2011 009 943 A1 discloses an energy absorption system to be installed between a bumper and a crossmember of a motor vehicle, in which a soft component and a hard component are enmeshed in one another and extend across the entire width of the motor vehicle. When the known energy absorption system is used, a comparatively large overhang (i.e. the distance from the wheel center to the frontmost point of the front trim panel) can result, this not always being desired from an aesthetic point of view and additionally having a negative impact on the ramp angle of the corresponding motor vehicle.

The object of the present invention is to overcome the drawbacks of the prior art.

This and other objects are achieved by a deformation element having a crossmember holder for attaching to a crossmember and a bumper plate that is positionable next to a bumper of the motor vehicle. A centrifugal-force-activated release element for adjusting and locking the distance between the crossmember holder and bumper plate is provided between the bumper plate and crossmember holder. A first distance between the bumper plate and crossmember holder, starting from a normal position, in a first position is greater than a distance in a second position.

The deformation element according to the invention has a crossmember holder for attaching to a crossmember and a bumper plate that is positionable next to a bumper of a motor vehicle. Furthermore, a centrifugal-force-activated release element for adjusting and locking the distance between the crossmember holder and bumper plate is provided between the bumper plate and crossmember holder, wherein a first distance between the bumper plate and crossmember holder, starting from a normal position, in a first position is greater than a distance in a second position.

By means of a deformation element configured in such a way, reliable and precise load-case-dependent actuation of the deformation element is advantageously allowed.

According to an advantageous configuration of the deformation element according to the invention, provision is made for the bumper plate to be arranged on the centrifugal-force-activated release element, which is located in a displaceable manner in a displacement device that is movable with respect to a holding device fastened to the crossmember holder, wherein the holding device and the displacement device have a common locking device which is configured to be optionally locked or releasable by the centrifugal-force-activated release device such that it allows the holding device and displacement device to be locked in the first position and allows the holding device and displacement device to be released in the second position. This allows a further-optimized load-case-dependent triggering and displacement of the deformation element according to the invention.

A particularly simple design of the deformation element according to the invention is achieved when the centrifugal-force-activated release device has a plunger or piston, at one end of which the bumper plate is arranged and at the other end of which at least one centrifugal lever is arranged, which butts against the release device when the second position is taken up.

When, according to a further embodiment, at least one centrifugal lever has a resetting device, load-case-dependent settability of the deformation element according to the invention is advantageously rendered easier.

According to an advantageous development of the deformation element according to the invention, provision is made for the locking device to be located in the displacement device and the holding device in a resettable manner.

The abovementioned object is likewise achieved by a motor vehicle having a crossmember and a bumper, wherein a deformation element of the type according to the invention and set out above is provided. The abovementioned advantages apply in a corresponding manner.

According to the invention, a number of deformation elements according to the invention can be provided in the vehicle transverse direction, such that a whole range of load cases or protective functions are realized. In this case, the position thereof, for example the arrangement thereof parallel to the vehicle vertical axis, is designable freely with respect to a vehicle body and is limited only by the underlying load case.

Particularly advantageously, the deformation elements fastened in such a way, in particular along the crossmember, have at least partially centrifugal-force-activated release elements with different masses, dimensions and/or resetting device, in particular springs with different spring constants. This allows the deformation elements to adapt easily to different load cases in a position-dependent manner.

BRIEF DESCRIPTION OF THE DRAWINGS

FIG. 8 is a side view of the alternative deformation element shown in FIG. 6 in a second position taken up in the case of a pedestrian protection function.

FIG. 9 is a partial view from above of a motor vehicle with a number of mounted deformation elements according to the invention.

DETAILED DESCRIPTION OF THE DRAWINGS

A detailed, nonprejudicial, in particular nonlimiting, description of exemplary embodiments of the present invention is given in the following text with reference to FIGS. 1 to 9. Identical elements are provided with identical reference signs, unless stated otherwise.

Figure 1:
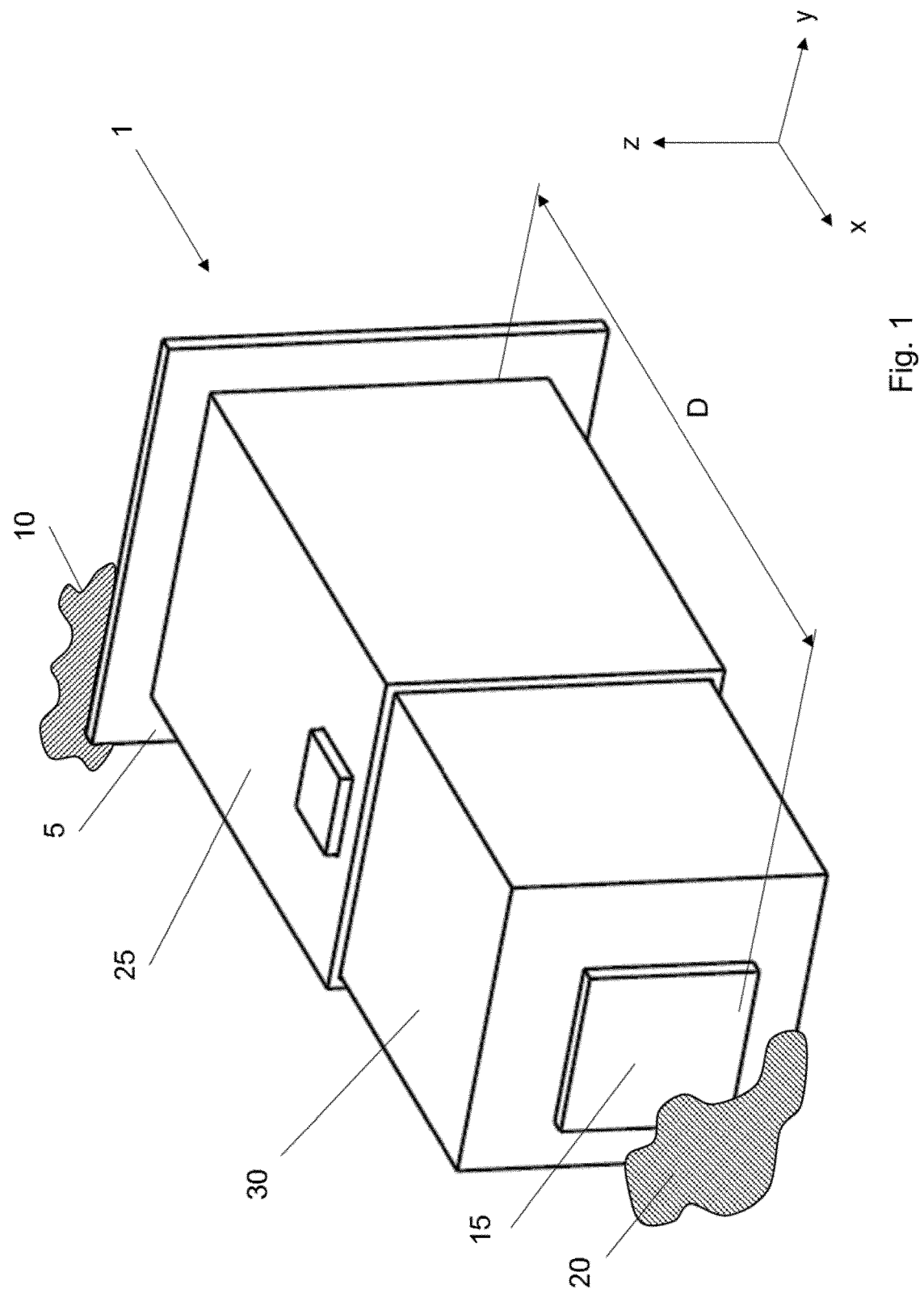
FIG. 1 is an isometric view of a deformation element according to an embodiment of the invention in a normal position.

FIG. 1 shows—in an isometric view—a deformation element 1 according to the invention having a crossmember holder 5 for attaching to a crossmember 10 and having a bumper plate 15 located on the opposite side therefrom, said bumper plate 15 being positionable next to a bumper 20 or being connectable thereto. The crossmember holder 5 can be fixed to the crossmember 10 in a manner known per se by fastening elements, for example screws, that are not shown here.

Fastened to the crossmember holder 5 is a holding device 25 in which a displacement device 30 is accommodated in a displaceable manner. The bumper plate 15 for its part is mounted in the displacement device 30 likewise in a displaceable manner. The distance between the crossmember holder 5 and bumper plate 15 is D in the normal position shown here, i.e. outside of any crash situation.

Figure 2:
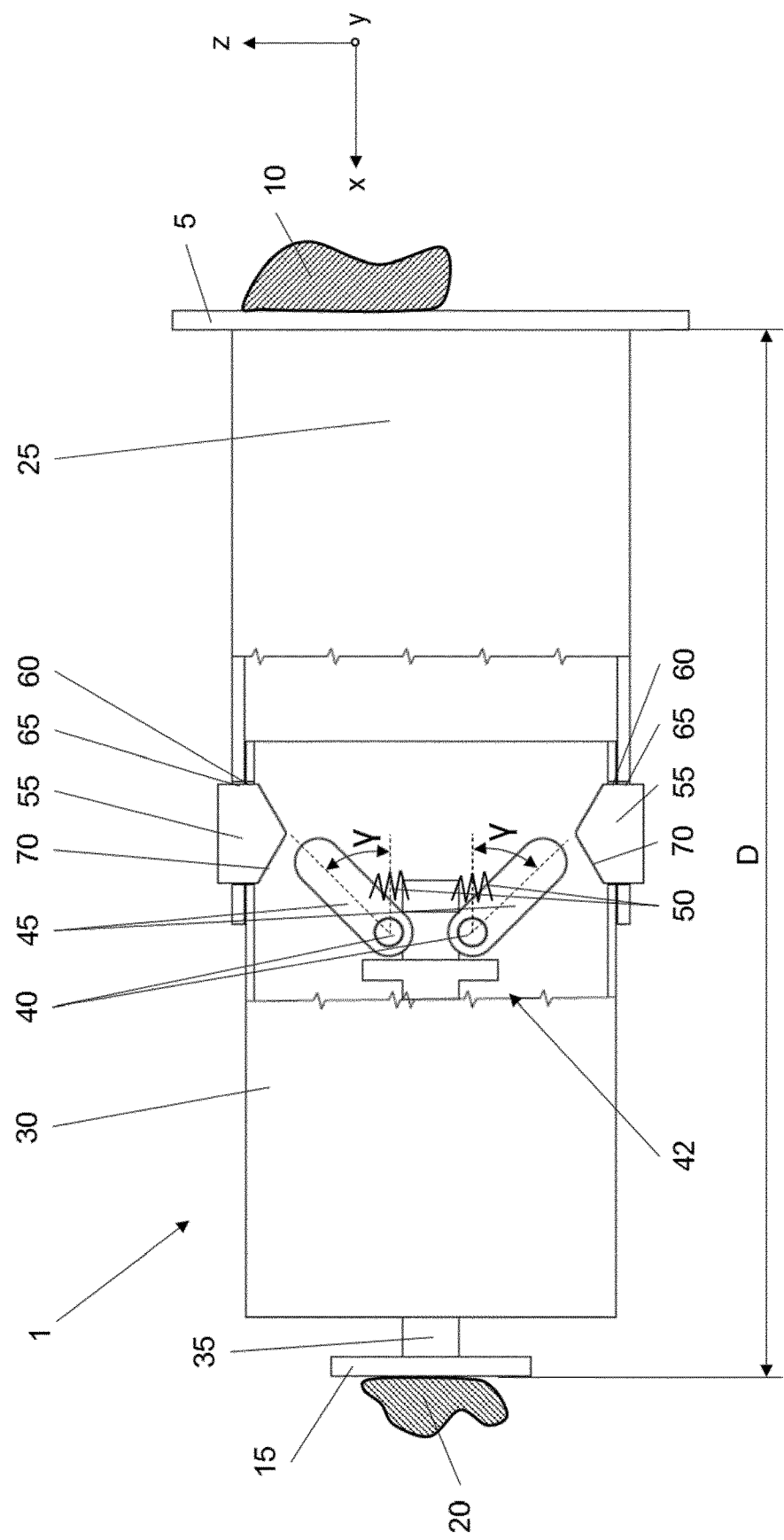
FIG. 2 is a side view of the deformation element shown in FIG. 1 in section.

The deformation element 1 illustrated in FIG. 1 is shown again in FIG. 2 in a side view in section. The bumper plate 15 is guided in a displaceable manner in the displacement device 30 by means of a piston 35 known per se. At its end remote from the bumper plate 15, the piston 35 has, in the exemplary embodiment shown here, a centrifugal-force-activated release device 42. The latter has two centrifugal levers 45 which are arranged so as to be pivotable about respective axes of rotation 40 and which are oriented, by resetting device 50 illustrated symbolically here, at an angle $\gamma$ to an x-y plane of a vehicle-oriented Cartesian coordinate system. The resetting device 50 can be springs which are configured in particular as torsion springs that act about the axes of rotation 40 or as tension springs. The resetting device 50 configured as tension springs are held at one end on the respective centrifugal levers 45, at a distance from the respective axes of rotation 40, and on the right-hand end, shown in FIG. 2, of the piston 35. It should be noted that not only a return of the centrifugal-force-activated release device 42 but also the triggering thereof can be set by the resetting device 50, in particular by the spring constant thereof.

In a normal position, displacement of the displacement device 30 within the holding device 25 is prevented by, in this exemplary embodiment, two locking devices 55. The locking devices 55 are each mounted in a displaceable manner in respective openings 60 in the displacement device 30 and openings 65 in the holding device 25. Each locking device 55 is provided with a run-on slope 70, against which the respective ends, distally remote from the pivot axes 40, of the respective centrifugal levers 45 come into abutment.

Figure 3:
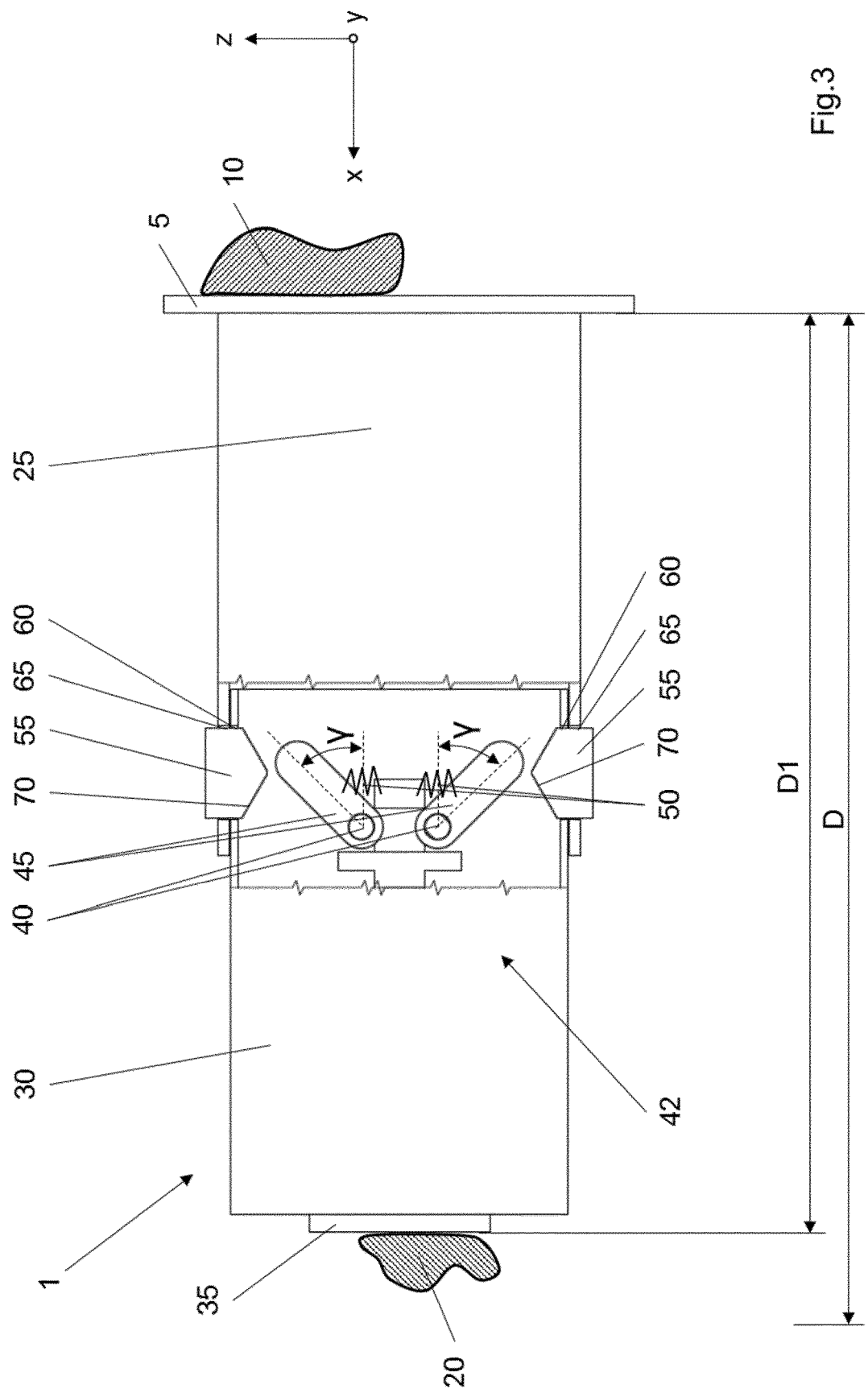
FIG. 3 is a side view of the deformation element according to the invention in a first position taken up in the case of a low speed crash.

Starting from the normal position, shown in FIGS. 1 and 2, of the deformation element 1 according to the invention, said deformation element 1 takes up the first position, shown in FIG. 3, in the case of a low speed collision. In the event of a low speed crash, comparatively large loads of up to 100 kN act at comparatively low speeds of 4 km/h to about 20 km/h.

In such a load case, the piston 35 plunges into the displacement device 30, wherein the angle $\gamma$ is substantially maintained on account of inertia. The two centrifugal levers 45 thus do not move in the z direction such that they would strike the respective run-on slopes 70. Thus, the locking devices 55 remain in their position and the bumper plate 15 only moves to a point at which it comes into contact with the displacement device 30. The distance D1, established in the process, between the bumper plate 15 and crossmember holder 5 is in this case less than the distance D in the normal position.

Figure 4:
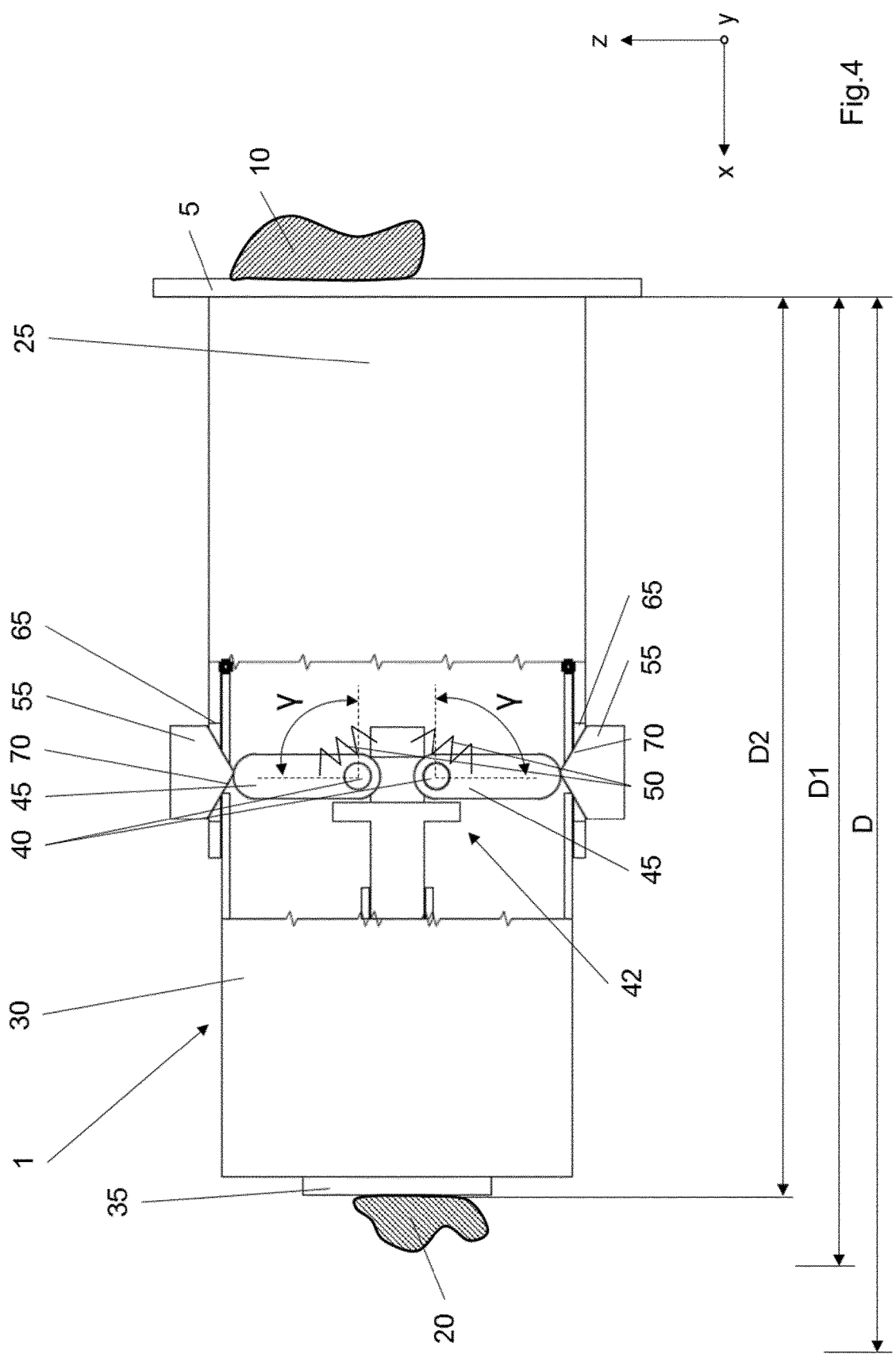
FIG. 4 is a side view of the deformation element according to the invention in a second position taken up in the case of a pedestrian protection function.

FIG. 4 shows a side view of the deformation element 1 according to the invention in a second position, which it takes up in the case of a pedestrian protection function. For the purpose of the pedestrian protection function, the deformation element 1 according to the invention is intended to absorb the impact energy at relatively high speeds of about 20 km/h to 40 km/h, but a comparatively low load level of up to about 5 kN.

On account of the comparatively large acceleration that occurs in this load case, the piston 35 does not just plunge into the displacement device 30, but rather the centrifugal levers 45 are deployed in the z direction on account of centrifugal force (the upper centrifugal lever 45 shown in FIG. 4 is thus moved in the z direction and the lower centrifugal lever 45 illustrated in this figure is thus moved counter to the z direction). As can be gathered from FIG. 4, this results in contact between the ends, distally remote from their respective axes of rotation 40, of the centrifugal levers 45 with the respective run-on slopes 70 and, consequently, in displacement of the locking devices 55 in the z direction. In such a case, the opening 60 is freed and so not only the bumper plate 15 is moved to the right in the figure, but also the displacement device 30.

This procedure allows a maximum reduction in the distance D to a distance D2 of the bumper plate 15 from the crossmember holder 5 in the second position, representing a low speed crash. As can be gathered from FIG. 4, the distance D2 is less than the distance D1, which for its part is less than the distance D and greater than the distance D2.

Figure 5:
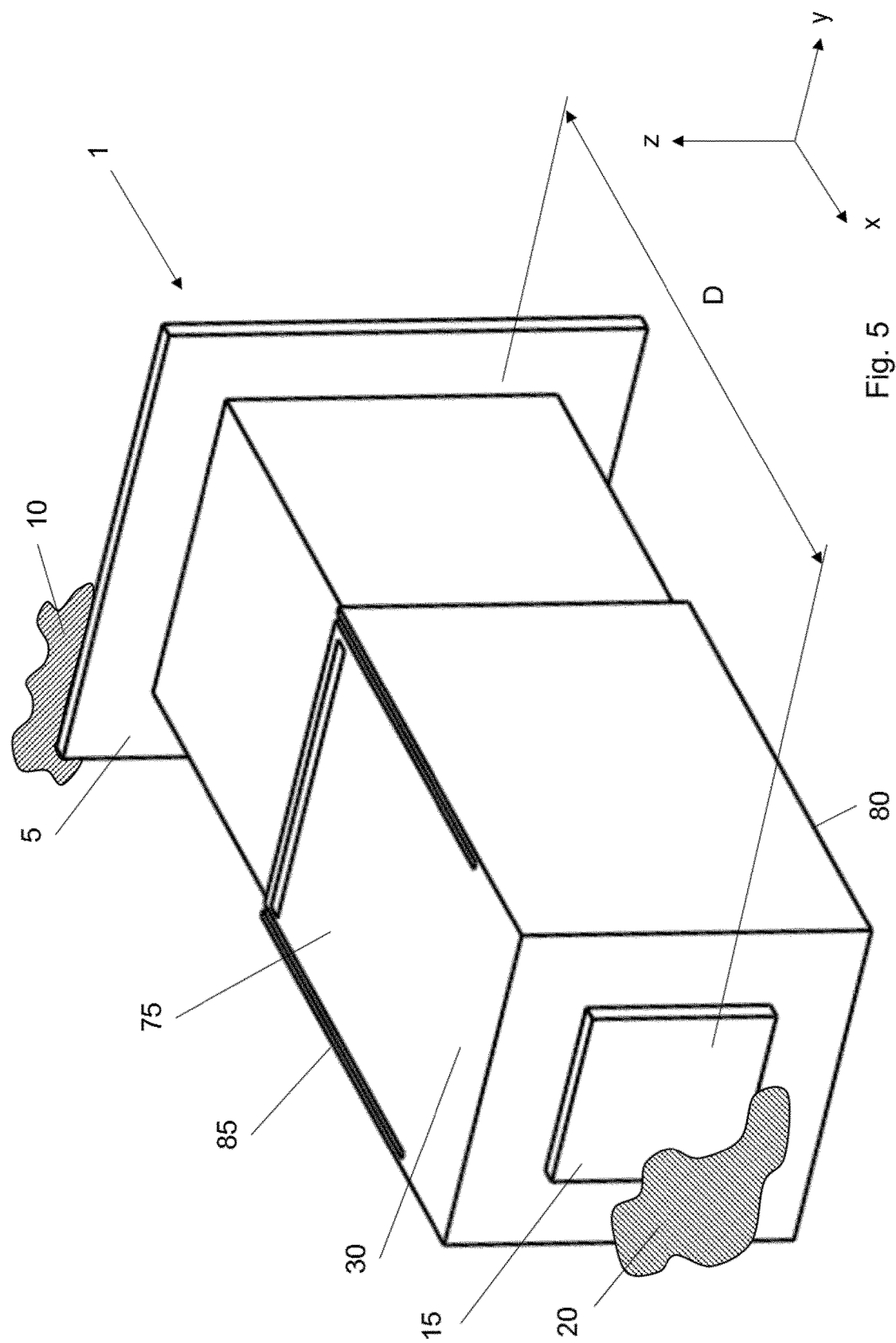
FIG. 5 is an isometric view of an alternative embodiment of the deformation element according to the invention in a normal position.

FIG. 5 shows—in an isometric view and a normal position—an alternative embodiment of the deformation element 1 according to the invention. In the case of said deformation element 1, the displacement device 30 has a top side 75 and an underside 80 having slots 85 extending in the longitudinal direction of the displacement device 30, such that the respective portion, next to the crossmember holder 5 of the top side 75 or underside 80, of the displacement device 30 is able to be deployed with respect to the end next to the bumper plate 15 with respect to an x-y plane.

Figure 6:
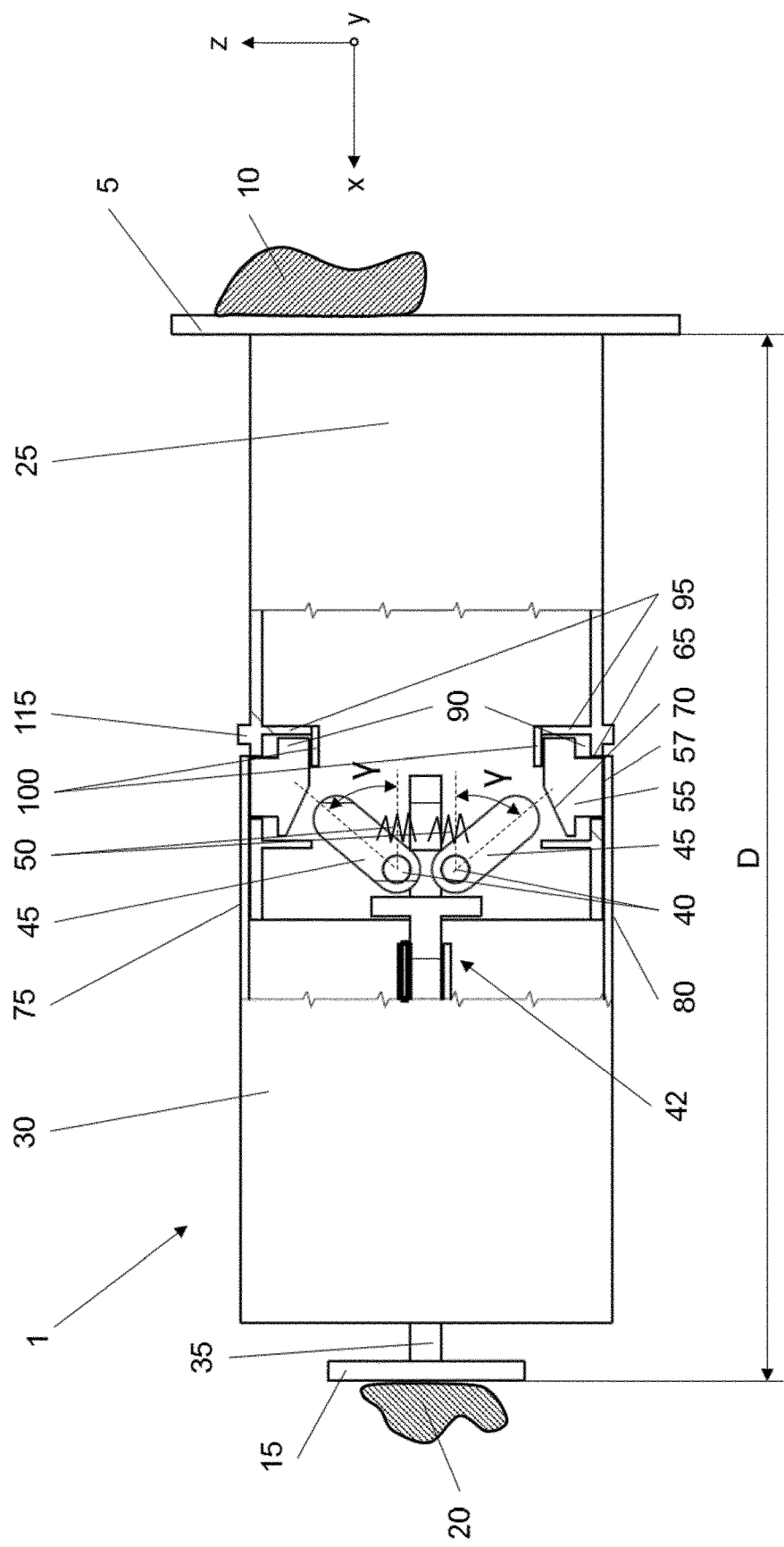
FIG. 6 is a side view of the deformation element shown in FIG. 6 in section.
Figure 7:
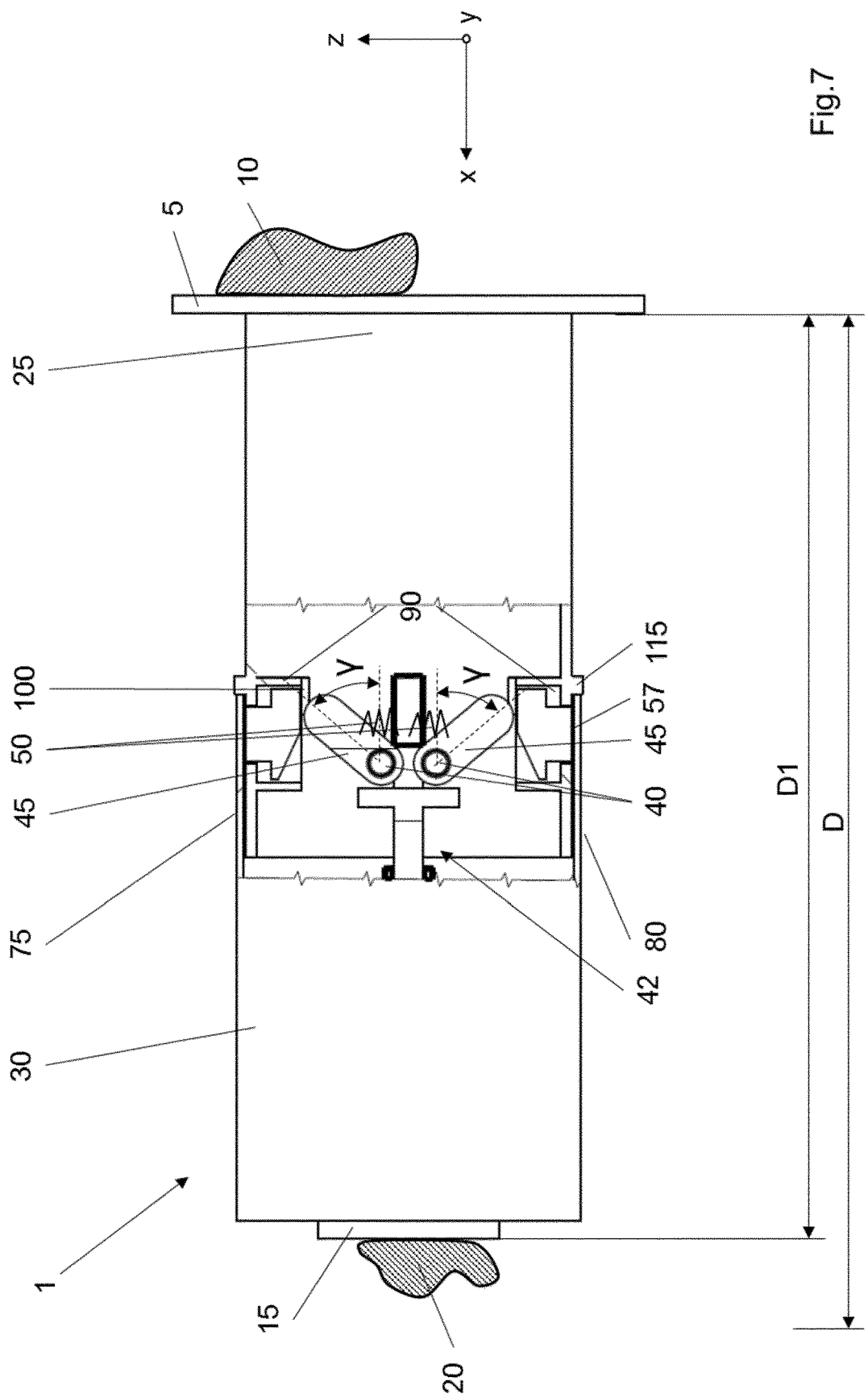
FIG. 7 is a side view of the alternative deformation element shown in FIG. 6 in a first position taken up in the case of a low speed crash.

The deformation element 1 illustrated in FIG. 5 is shown again in FIG. 6 in a side view in section. While the centrifugal-force-activated release element 42 in this exemplary embodiment corresponds to the above-described exemplary embodiment, the locking devices 55 of the two embodiments differ. In the exemplary embodiment shown here, the locking device 55 is located in a holding device 90 which prevents the displacement thereof in the x direction and z direction by means of respective stops 95 and 100. By way of an abutment portion 57 projecting through the opening 65 in the holding device 25, the locking device 55 butts against the displacement device 30. Thus, while, in the exemplary embodiment shown with reference to FIGS. 1 to 4, the displacement device 30 can plunge into the holding device 25, the displacement device 30 shown in this FIG. 6 can move over the holding device 25 until it comes into abutment against a stop 115. This is the case, as shown in FIG. 7, when the alternative deformation element 1 takes up the low speed crash position, in which the bumper plate 15 comes into abutment against the displacement device 30. In this case, too, the acceleration of the centrifugal-force-activated release device 42 is not great enough to overcome the inertia of the centrifugal levers 45 and to deploy the latter in the z direction in order to open the locking device 55.

The latter does take place, however, as already explained above, in the case of a pedestrian protection function being taken up in accordance with FIG. 8. In this case, the centrifugal levers 45 collide with the run-on slopes 70 such that the locking device 55 lifts the top side 75 and underside 80, respectively, beyond the stop 115. This procedure allows a maximum reduction in the distance D in the normal position to a distance D2 of the bumper plate 15 from the crossmember holder 5; here, too, the distance D2 is thus less than the distance D1, which for its part is less than the distance D and greater than the distance D2.

FIG. 9 shows a schematic plan view of the front region of a motor vehicle 110 according to the invention, to which the crossmember 10 is fastened by way of mountings 115. The bumper 20 is, in accordance with the normal position shown here, the element that projects farthest out in the main direction of travel F of the motor vehicle 110. Along the length of the crossmember 10, four deformation elements 1 according to the invention are distributed in the transverse direction Q in the exemplary embodiment shown here. The respective characteristics of the deformation elements 1, in particular the respective distances D, D1, D2 thereof from one another, and the conditions under which these distances D, D1, D2 are achieved, are set in a position- and load-case-dependent manner for each individual deformation element 1. To this end, provision can be made, for example, for each individual deformation element 1 and/or a group of the latter to have centrifugal-force-activated release elements with different 42 masses, dimensions and/or resetting devices.

Depending on the crash situation, the distances D of the individual deformation elements decrease as desired in different or identical ways.

LIST OF REFERENCE SIGNS

1 Deformation element
5 Crossmember holder
10 Crossmember
15 Bumper plate
20 Bumper
25 Holding device
30 Displacement device
35 Piston
40 Axis of rotation
42 Centrifugal-force-activated release element
45 Centrifugal lever
50 Resetting device
55 Locking device
57 Abutment portion
60 Opening
65 Opening
70 Run-on slope
75 Top side
80 Underside
85 Slots
90 Holding device
95 Stop
100 Stop
115 Stop
D, D1, D2 Distances
F Main direction of travel
Q Vehicle transverse direction
γ Angle
x, y, z Cartesian vehicle-oriented coordinate system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A deformation element for a motor vehicle having a crossmember and a bumper, the deformation element comprising:
   a crossmember holder configured for mounting to the crossmember of the motor vehicle;
   a bumper plate positionable next to the bumper of the motor vehicle;
   a centrifugal-force-activated release element that adjusts a distance between the crossmember holder and the bumper plate using a centrifugal lever of the centrifugal-force-activated release element which centrifugal lever is configured to be activatable by centrifugal force applied to the centrifugal lever, the centrifugal-force-activated release element being arranged between the bumper plate and the crossmember holder, wherein
   a first distance between the bumper plate and the crossmember holder, starting from a normal position, in a first position is greater than a distance in a second position.

2. The deformation element as claimed in claim 1, wherein
   the crossmember holder has a holding device fastened thereto, a displacement device is movable with respect to the holding device, wherein the centrifugal-force-activated release element is located in a displaceable manner in the displacement device, and the bumper plate is arranged on the centrifugal-force-activated release element, and a common locking device is provided for the holding device and the displacement device, the common locking device being configured to be optionally locked or released by the centrifugal-force-activated release element such that it allows the holding device and the displacement device to be locked in the first position and allows the holding device and the displacement device to be released in the second position.

3. The deformation element as claimed in claim 2, wherein
the centrifugal-force-activated release element comprises a piston, wherein
at one end of the piston the bumper plate is arranged,
at the other end of the piston the centrifugal lever is arranged, and
the centrifugal lever butts against the release element when the second position is taken up.

4. The deformation element as claimed in claim 3, wherein the centrifugal lever has a resetting device.

5. The deformation element as claimed in claim 1, wherein
the locking device is located in the displacement device and the holding device in a resettable manner.

6. The deformation element as claimed in claim 3, wherein
the locking device is located in the displacement device and the holding device in a resettable manner.

7. The deformation element as claimed in claim 4, wherein
the locking device is located in the displacement device and the holding device in a resettable manner.

8. A motor vehicle, comprising:
a crossmember;
a bumper;
a deformation element, wherein the deformation element comprises:
a crossmember holder configured for mounting to the crossmember of the motor vehicle;
a bumper plate positionable next to the bumper of the motor vehicle;
a centrifugal-force-activated release element that adjusts a distance between the crossmember holder and the bumper plate using a centrifugal lever of the centrifugal-force-activated release element which centrifugal lever is configured to be activatable by centrifugal force applied to the centrifugal lever, the centrifugal-force-activated release element being arranged between the bumper plate and the crossmember holder, wherein a first distance between the bumper plate and the crossmember holder, starting from a normal position, in a first position is greater than a distance in a second position.

9. The motor vehicle as claimed in claim 8, wherein
the crossmember holder has a holding device fastened thereto,
a displacement device is movable with respect to the holding device, wherein the centrifugal-force-activated release element is located in a displaceable manner in the displacement device, and the bumper plate is arranged on the centrifugal-force-activated release element, and
a common locking device is provided for the holding device and the displacement device, the common locking device being configured to be optionally locked or released by the centrifugal-force-activated release element such that it allows the holding device and the displacement device to be locked in the first position and allows the holding device and the displacement device to be released in the second position.

10. The motor vehicle as claimed in claim 9, wherein
the centrifugal-force-activated release element comprises a piston, wherein
at one end of the piston the bumper plate is arranged,
at the other end of the piston the centrifugal lever is arranged, and
the centrifugal lever butts against the release element when the second position is taken up.

11. The motor vehicle as claimed in claim 10, wherein the centrifugal lever has a resetting device.

12. The motor vehicle as claimed in claim 9, wherein
the locking device is located in the displacement device and the holding device in a resettable manner.

13. The motor vehicle as claimed in claim 8, further comprising:
a plurality of the deformation elements arranged in a vehicle transverse direction, wherein
the centrifugal-force-activated release element of each of the plurality of the deformation elements are not identical.

14. The motor vehicle as claimed in claim 13, wherein
the centrifugal-force-activated release elements have at least one of different mass, dimensions, and resetting devices.

* * * * *